US012629635B2

(12) United States Patent
Fuglesang et al.

(10) Patent No.: US 12,629,635 B2
(45) Date of Patent: May 19, 2026

(54) SYSTEM AND METHOD FOR DESALINATION OF WATER

(71) Applicant: FSubsea AS, Oslo (NO)

(72) Inventors: Alexander Fuglesang, Oslo (NO);
David Pinchin, Hundvåg (NO)

(73) Assignee: FSubsea AS, Oslo (NO)

( * ) Notice: Subject to any disclaimer, the term of this patent is extended or adjusted under 35 U.S.C. 154(b) by 264 days.

(21) Appl. No.: 18/278,581

(22) PCT Filed: Mar. 2, 2022

(86) PCT No.: PCT/NO2022/050055
§ 371 (c)(1),
(2) Date: Aug. 23, 2023

(87) PCT Pub. No.: WO2022/186698
PCT Pub. Date: Sep. 9, 2022

(65) Prior Publication Data
US 2024/0123404 A1 Apr. 18, 2024

(30) Foreign Application Priority Data

Mar. 2, 2021 (NO) .................................... 20210280
May 21, 2021 (NO) .................................... 20210635

(51) Int. Cl.
*B01D 61/02* (2006.01)
*B01D 61/04* (2006.01)
(Continued)

(52) U.S. Cl.
CPC ........... *B01D 61/08* (2013.01); *B01D 61/025* (2013.01); *B01D 61/04* (2013.01); *B01D 65/02* (2013.01);
(Continued)

(58) Field of Classification Search
CPC .. B01D 61/025; C02F 1/441; C02F 2201/004; C02F 2201/007; F04D 13/086
See application file for complete search history.

(56) References Cited

U.S. PATENT DOCUMENTS

| | | | |
|---|---|---|---|
| 4,277,344 A | 7/1981 | Cadotte | |
| 2007/0039860 A1* | 2/2007 | Krock ..................... | C02F 1/441 210/652 |

FOREIGN PATENT DOCUMENTS

| | | |
|---|---|---|
| WO | WO-2019032800 A1 | 2/2019 |
| WO | WO-2020076164 A1 | 4/2020 |
| WO | WO-2020127977 A1 | 6/2020 |

OTHER PUBLICATIONS

Stangroom, J. E. "Subsea Manipulation of Heavy Loads Using Fresh Water: A Concept Study." Underwater Technology 21.2 (1995): 30-40. (Year: 1995).*

(Continued)

*Primary Examiner* — Bradley R Spies
(74) *Attorney, Agent, or Firm* — Bradley Arant Boult Cummings LLP

(57) ABSTRACT

A system for producing desalinated water from seawater or other saline water, wherein the system comprises the following equipment features or equipment items, in a typical direction of flow: a subsea seawater inlet, a subsea pretreatment stage, at least comprising one or more of a subsea filter and/or a subsea seawater pre-treatment unit and/or a subsea coarse screen unit, and/or a hydrocyclone, a subsea feed pump, fluidly coupled to, a subsea RO unit, a subsea product pump fluidly coupled to a RO unit product outlet, a product line fluidly coupled to the subsea product pump, and a RO unit reject outlet, preferably coupled to a reject line. The system is distinctive in that: the subsea seawater inlet is at a depth below or within the thermocline layer of the seawater, that is below the epipelagic zone, or as close as (Continued)

feasible if the local depth is insufficient to reach the thermocline layer, and wherein the system preferably is without any barrier fluid supply to the subsea pumps.

24 Claims, 6 Drawing Sheets

(51) Int. Cl.

| | | |
|---|---|---|
| *B01D 61/08* | (2006.01) | |
| *B01D 65/02* | (2006.01) | |
| *C02F 1/38* | (2023.01) | |
| *C02F 1/44* | (2023.01) | |
| *C02F 103/08* | (2006.01) | |

(52) U.S. Cl.
CPC ................ *C02F 1/38* (2013.01); *C02F 1/441* (2013.01); *B01D 2311/04* (2013.01); *B01D 2313/243* (2013.01); *B01D 2321/04* (2013.01); *C02F 2103/08* (2013.01); *C02F 2303/16* (2013.01)

(56) References Cited

OTHER PUBLICATIONS

Gille, Detlef, "Seawater intakes for desalination plants," Desalination, vol. 156, Issues 1-3, Aug. 2003, pp. 249-256.

United Nations, "UN-Water SDG 6 Public Dialogue Report—Clean Water and Sanitation," Jan. 31, 2019, 32 pages, https://www.unwater.org/publications/sdg-6-public-dialogue-report accessed on Jan. 2, 2025.

Patent Cooperation Treaty, "International Search Report," International Application No. PCT/2022/050055, May 15, 2022.

sciencedirect.com, "Osmotic Pressure," Elsevier B.V., 10 pages, https://www.sciencedirect.com/topics/chemistry/osmotic-pressure, last accessed Aug. 23, 2023.

Sigman, Daniel et al., "The Biological Productivity of the Ocean," Nature Education Knowledge 3, Issue 10, No. 21, 2012, https://www.nature.com/scitable/knowledge/library/the-biological-productivity-of-the-ocean-70631104/ , last accessed Aug. 23, 2023, 5 pages.

Wurl, Oliver et al., "Production and fate of transparent exopolymer particles in the ocean," Journal of Geophysical Research, vol. 116, Dec. 30, 2011, 16 pages, doi:10.1029/2011JC007342, 2011.

* cited by examiner

Semi Submersed Tow to Site

Evacuate air and Lower to Base

SYSTEM AND METHOD FOR DESALINATION OF WATER

TECHNICAL FIELD

The present invention relates to production of desalinated water or clean water or freshwater, that is water with less than 0.3% salinity. Said water is produced from saline water, that is water with 3-5% salinity, typically water from the salt sea, ocean or fjords or bays; or brackish water, that is water with –0.3% up to 3% salinity, or alternatively from contaminated water. The invention relates to a system or a plant for such production, a method for installation, operation and/or maintenance of the system of the invention.

BACKGROUND ART

Freshwater is a limited resource and may be a major source of conflicts, as explicitly described in the UN Sustainable Development Goal 6—"Water is at the heart of the 2030 Agenda for Sustainable Development. It underpins our livelihoods, our health, our environment and our economies. To sustainably manage water is to invest in the future of not only the current generation, but for all generations to come. Its aim is to ensure availability and sustainable management of water and sanitation for all, is essential to shift the world onto a resilient path leaving no one behind".

Less than 1% of all water is easily accessible freshwater from surface or groundwater sources, about 70% of which is used for agriculture. In contrast, about 97% of all water is saline water.

Desalination is the process of reducing the contents of dissolved salts in saline water or brackish water. During the last decades, reverse osmosis has become the most feasible method for desalination, mainly due to significant cost reduction by more effective reverse osmosis membranes and by the introduction of more effective energy recovery.

Reverse osmosis is the diffusion of water molecules from the saline side of a reverse osmosis membrane, a semipermeable membrane, to the side of lower salinity, achieved by pressurizing the saline side fluid to a pressure above the osmotic pressure head. The semipermeable membrane allows water molecules to diffuse through, but not larger molecules or molecules that are ions, aggregated or with other features that prevent the diffusion through the semipermeable membrane. The basic design of a reverse osmosis membrane is described and illustrated in patent publication U.S. Pat. No. 4,277,344.

Despite comprehensive efforts and improvements over many years there is still a demand for improved systems and methods for production of freshwater by reverse osmosis and methods of operation and uses of products thereby. Problems with the water intake, corrosion, large power consumption, large area requirement, large operating and maintenance cost, large labor requirement and lack of stability of operation are some of the possible fields of improvements. The objective of the invention is to meet the demand by providing structure, methods and/or uses having a positive effect on one or more of the possible fields of improvement.

SUMMARY OF INVENTION

The invention provides a system for producing desalinated water from seawater or other saline water, wherein the system comprises the following equipment features or equipment items, in a typical direction of flow:

a subsea seawater inlet, a subsea pretreatment stage, at least comprising one or more of a subsea filter and/or a subsea seawater pretreatment unit and/or a subsea coarse screen unit, and/or a hydrocyclone, a subsea feed pump, fluidly coupled to, a subsea RO unit, a subsea product pump fluidly coupled to a RO unit product outlet, a product line fluidly coupled to the subsea product pump, and a RO unit reject outlet, preferably coupled to a reject line.

The system is distinctive in that:

the subsea seawater inlet is at a depth below or within the thermocline layer of the seawater, that is below the epipelagic zone, or as close as feasible if the local depth is insufficient to reach the thermocline layer, and wherein the system preferably is without any barrier fluid supply to the subsea pumps.

Preferably, the system comprises one or more subsea treatment pods, arranged at a depth below or within the thermocline layer of the seawater, that is below the epipelagic zone, or as close as feasible if the local depth is insufficient to reach the thermocline layer, the subsea treatment pods comprise operatively arranged equipment items, which equipment items are chosen at least from the equipment items or equipment features defined above, and which treatment pods are retrievable.

Preferably, the system is without any external barrier fluid supply to the subsea pumps, wherein the pumps only require process train fluid in, process train fluid out and power and control to be operative. Accordingly, the couplings required for the pumps to be operable, in addition to process train fluid in (pretreated seawater or product permeate/freshwater) and out, consist of power and control, with no barrier fluid supply required, not even for the product pump. Thereby, the overall system requirements and infrastructure are significantly reduced and required operations are significantly simplified. In addition, contamination of the product, the produced freshwater, from the pumps is eliminated.

A treatment pod in this context means a frame structure, cage structure or support structure supporting one or more equipment items of the system, wherein the whole treatment pod is retrievable in one operation. Typically, a plurality of equipment items, arranged on the treatment pod, are retrievable in one operation and are installable in one operation. Typically, one or two flowline coupling parts are included and one coupling part for power or combined power and control, for each treatment pod. Preferably, the coupling parts are remotely operable, by the mating operation while installing and/or by a ROV (Remotely operable Vehicle) or ROT (remotely Operable Tool). The treatment pod can include equipment items that are retrievable and thus replaceable individually. Each treatment pod is arranged on a more permanent foundation base on the seabed.

Preferably, the system comprises treatment pods with retrievable equipment features operatively arranged on treatment pod. Preferably, at least the pretreatment unit equipment are retrievable without retrieving the whole treatment pod. All equipment features not facing high pressure, that is up to the inlet to the subsea product pump, can preferably be retrievable for some embodiments. However, in many embodiments also the subsea product pump is retrievable.

The system preferably is comprising subsea mateable fluid connections, preferably comprising subsea mateable flowline couplings, with or without clamps, for horizontally and/or vertically oriented flowlines or pipe sections, such as a subsea hose connector, preferably at least one in either end of each treatment pod downstream to the treatment pod or arrangement of the subsea inlet. Commercial subsea mateable flowline coupling suppliers include DESTEC, Oilstates, Baker Hughes, Oceaneering and OneSubsea.

The system preferably is comprising light work class ROV operable subsea connectors, preferably by a light work-class ROV, for mating and un-mating flowline couplings. A light work class ROV, Remotely Operable Vehicle, is an ROV class in between an observation class ROV and a work class ROV for heavy duty tasks. The light work class ROV at least comprises one manipulator function for valve operation and/or torque tool operation, in addition to camera function, for example comprising a manipulator arm able to turn at least ±90° for opening or closing a clamp connector.

Preferably, all manipulation-operative tasks for the light work class ROV takes place from only one or two sides of the treatment pods of the system of the invention. Preferably, a docking structure is provided on the treatment pod for eliminating the reaction forces and facilitating the operation of the light work class ROV. The light work class ROV, available from most ROV providers, can be deployed from a light service vessel without a heavy cage around the ROV, allowing lighter intervention vessels or service vessels to undertake the operations. When the ROV is thrusting forward, with complimentary shaped structure abutting into the docking structure, reaction forces are eliminated and positioning is fixed of the structures to be operated by the ROV on the treatment pod. The system preferably comprises a control panel with integrated docking structure for an ROV, such as a light work class ROV, with control devices for most or all subsea operation tasks operable for the light work class ROV, preferably including coupling-decoupling of treatment pods and/or equipment items from the subsea treatment pods.

The system preferably is comprising stab in couplings between the prefiltration unit equipment features and the treatment pods. Stab in couplings are connections that do not require rotation to mate. Preferably, the stab in connections are balanced, meaning that the flow port directions of the male and female parts are oriented 90° apart, thus eliminating reaction forces. Preferably, the stab in couplings are one bore or two bore couplings, with in- and out flow bores.

The system preferably is comprising treatment pod frames on some or all of the treatment pods, which treatment pod frames are structure for lifting the treatment pods for retrieval and installation, structure protecting the equipment features through the splash zone and impacts during deployment and retrieval, and also trawler and fishing net protection when on the seabed.

The frames, and/or the treatment pods, preferably comprise tanks for ballasting and de-ballasting, for facilitating installation and retrieval, preferably arranged at a high elevation location in the frames and/or treatment pod, for hydrodynamic stability.

The system preferably is comprising transponders or similar equipment for positioning, arranged on guideposts, guidepost funnels, coupling parts and/or other equipment items. The system also preferably comprises cameras and lights on equipment items and/or on treatment pods, coupled to a control system, monitorable and controllable from an installation and/or maintenance vessel, or a control room elsewhere. Installation and retrieval are thereby facilitated.

The invention also provides a method for installation, operation and/or maintenance of the system of the invention. The method comprises one or more of the features as follows, in any combination:

to wet-tow treatment pods to location or transport otherwise, to install the treatment pods with tanks for ballasting filled with air or at vacuum, whereby the ballast tanks are emptied successively until negative buoyancy reach a feasible level, after which the treatment pod is deployed to location, preferably using transponders and/or cameras for position control, treatment pods with foam based buoyancy elements, such as syntactic foam buoyancy elements, to use ROV free coupling or couplings mateable by a light work class ROV when connecting the treatment pod to more permanent structure on the seabed, to use ROV free coupling or couplings mateable by a light work class ROV when disconnecting the treatment pod from more permanent structure on the seabed, to use ROV free coupling and disconnecting when installing or retrieving pre-treatment unit equipment items.

The method further comprises:

to use a feed pump differential pressure lower than normal practice when operation for reverse osmosis, typically 0.7-1 bar, preferably while the differential pressure is increased periodically, typically to 1-2 bar, and the reject thereby having significant pressure is directed for backflushing of filters and hydrocyclones of the pre-treatment unit, to operate the system at a low recovery rate of 15-70% of maximum recommended recovery rate on land of the RO units, preferably about 20-40% or about 30% of maximum recommended recovery rate. Operation with increased service or replacement intervals can thereby be provided.

Most preferably, the treatment pods of the system of the invention are located at depth below where photosynthesis and mixing with surface water occur. This means depth below or within the thermocline layer. Seawater below or within the thermocline is higher in salinity than lighter and warmer surface water, and far higher in nutrition since there is no photosynthesis consuming the nutrition.

Very surprisingly, locating not only the seawater inlet at depth below or within the thermocline layer, but many or most preferably all treatment pods of the system of the invention at depth below or within the thermocline layer, provides far less requirement for pre-treatment, prolonged operation of the RO units and reduced marine growth and scaling on the equipment items and treatment pods.

As observed from land or locations above sea surface level, the system of the invention preferably comprises one single umbilical for power and control from the surface location and one flowline of product freshwater, connecting the subsea part of the system with the parts above sea surface level.

Very surprisingly, about 40-80% or more reduced requirement for pre-treatment can be achieved by having the seawater inlet below or within the thermocline layer. Surprisingly, arranging the treatment pods with all equipment items subsea at depth below or within the thermocline layer is feasible with respect to several factors, such as a massive reduction in utility requirements on land and increased safety.

However, in some embodiments of the invention, a shallow water basin near shore, with water surface level below the sea surface level, but filled merely by seawater from below or within the thermocline layer or filled with produced fresh water, can be an alternative location of some of the equipment items or treatment pods.

Of great importance for the present invention is the location of the seawater intake and further equipment items and treatment pods. At least the seawater intake location should be chosen with great care since the technical effect on the whole system is far more dependent thereon than expected.

If the thermocline layer is not reachable or only the very highest parts thereof, the location of the seawater intake and preferably further equipment items and treatment pods, can be found as described below:

The location and depth of the seawater inlet is preferably determined by finding at which depth Silt Density Index (SDI), Transparent Exopolymer Particles (TEP) and/or light intensity is reduced from a surface water reference value by 20% more preferably 30%, 40%, 50%, 60%, 70%, 80%, 90%, 95%, 97%, 98% or most preferably 99% or more, wherein at least the seawater subsea inlet is to be at said depth or deeper below surface. The method used for measuring any one-off said parameters must be followed consistently. The sunlight intensity can be determined by light intensity metering, using equipment commercially available, at depth intervals. The concentration of transparent exopolymer particles (TEP) can be determined by measuring TEP spectrophotometrically, as explained in scientific articles, for example "Production and fate of transparent exopolymer particles in the ocean", Journal of Geophysical Research, Vol. 116, published Dec. 30, 2011. TEP will decrease significantly from below where significant agitation and mixing of biomaterial from surface water takes place, whereby measuring TEP, as indicated above, is one of several good indicators for avoiding mixing with surface water. Other indicators are concentration of bacteria, and phytoplankton, for example. Silt density index-SDI- of raw, untreated seawater at depth intervals is perhaps the best and most preferred indicator since it is correlated directly to membrane/filter fouling and pre-treatment requirement. SDI of raw, untreated seawater shall be measured at depth intervals following the standard test method ASTM D4189. For example, samples of raw, untreated seawater are taken at 1 m, 10 m and 20 m depth, wherein the highest value of SDI and/or TEP is used as reference, wherein further samples of raw, untreated seawater are taken at larger depth. The depth where SDI and/or TEP and/or sunlight intensity and/or mixing with surface water and/or bacteria is reduced from the reference value by 20% more preferably 30%, 40%, 50%, 60%, 70%, 80%, 90%, 95%, 97%, 98% or most preferably 99% or more, is said depth of the seawater subsea inlet.

In this context, the term "significant" means seawater with at least 20% reduced reverse osmosis type membrane fouling susceptibility, as dependent on SDI and/or TEP, or at least 20% reduced sunlight intensity, and/or 20% at least reduced mixing and/or bacteria concentration.

The SDI samples in the surface water and mixed layer is not necessarily taken for example at 1 m, 10 m and 20 m depth, or at for example 5 and 15 m, or 1, 15 and 30 m. Example depths are to ensure a representative result for surface water in the mixed layer. Clarity of the water, wind causing mixing and other factors can vary, resulting in that the depth or thickness of the mixed layer above the thermocline vary, from about 10 m in very confined waters down to at least about 100 m in the ocean. The thermocline layer can extend from about 10 m to about 1000 m depth in open warm ocean waters. More general information on terminology and conditions in the seawater can be found for example at: https://www.nature.com/scitable/knowledge/ibrary/the-biological-productivity-of-the-ocean-70631104/

A SDI value of 1 or below is assumed to provide years of stable operation of the RO membrane of the RO unit, without colloidal fouling. A SDI value of about 3, may imply cleaning of the RO-membrane in intervals of several months. A SDI value in the range 3-5 may imply cleaning in intervals of months to weeks. SDI above 5 require pre-treatment of the water to be desalinated. There may be spots of very clean water below the mixing zone, requiring no or modest pre-treatment in addition to the obligatory filter or coarse screen unit. Near surface, SDI can be up to at least about 200. There is not necessarily any clear exact correlation between decline in sunlight intensity or decline in particulate or suspended material causing fouling of the RO-membrane, so the most reliable parameter for inlet depth may be SDI. This is due to uncertain mix of phytoplankton, uncertain mix of zooplankton, flocculation thereof, and contents of other suspended material, organic and inorganic, causing fouling of the RO-membrane, varying around the globe, and around the year. Research indicate that Transparent Exopolymer Particles-TEP- can play a key role in biofouling of RO-membranes. TEP are very sticky particles that exhibit the characteristics of gels. It has been shown that these gel-particles are abundant and present worldwide in seawater—either in particle form, or as a dissolved polymer slime. TEP-concentration however decline with depth, decline with reducing sunlight and declining with declining algae blooming. In marine systems, the majority of TEP are formed abiotically (in the absence of life) from dissolved precursors, which are released by phytoplankton that are either actively growing or are senescent (growing old). TEP are also generated during the sloughing of cell surface mucus and the disintegration of colonial matrices. For one specific area however, inlet depth chosen according to decline in sunlight intensity and/or decline in one or more specific biological contents versus depth parameter can be sufficiently reliable, since the effect on the RO-unit will be predictable and the requirement for pre-treatment can be predicted. Concentration of Extracellular polymeric substances (EPS), produced by microorganisms, is in this context a synonymous to TEP. SDI can be correlated directly to the requirement for pretreatment, the other possible parameters mentioned, and probably further parameters for determining sufficient water intake depth can be correlated more or less directly to the pre-treatment requirement. Notice that the pre-treatment requirement not necessarily is equal to the exact type of pretreatment to choose, since too rough pre-treatment steps can crush cells and result in more TEP. Further testing and sampling, for example by SDI, downstream each pre-treatment step, can determine a feasible detailed total pre-treatment.

Without wishing to be bound by theory, the low concentration of biological cells and material in the deeper nutrition rich water results not only in less requirement for water pre-treatment, but also involves less cell destruction by the pretreatment, and, the growth of TEP and the synonymous EPS is low, since cells and bacteria, in the nutrition rich water, very surprisingly, will rather grow and duplicate than creating sticky gel-like biofouling. If the system is designed and operated as prescribed, the positive effect is higher than the negative effect of increased salinity of the feed water.

Preferably, the subsea pumps, at least the subsea product pump, comprise a magnetic coupling hermetically separating a motor compartment of the subsea pump from a water compartment of the subsea pump, wherein the motor in the motor compartment, via a motor shaft, drives a pump with a pump shaft contactless through the magnetic coupling, which water compartment contains bearings consisting of water lubricated bearings, which motor compartment contains bearings consisting of bearings lubricated with a motor compartment fluid contained in the motor compartment and cooling circuits coupled thereto, wherein any leakage of motor compartment fluid is eliminated and any requirement for barrier fluid supply to the subsea pump is eliminated, wherein the subsea pump is designed for at least 2, 3, 5, 8, 10, or more years of operation without retrieval for maintenance. Most surprisingly, the subsea pumps are operated and controlled merely through one or two couplings, consisting of electric power or electric power and control signals coupled to the subsea pump and any contamination from the subsea pumps to the product is eliminated. Utility, area and personnel requirements are thereby reduced, and reliability is improved since fewer failures can occur. The subsea pumps can however be of any feasible type, however, the degree of autonomous operation, and/or stability or reliability, lack of emissions or pollution and the resulting reduced long-term cost, then cannot be achieved fully or not at all.

Preferably, at least the seawater inlet but preferably also equipment items and/or treatment pods are located at or below 40 m, 60 m, 80 m, 100 m, 150 m or 200 m or 300 m depth, preferably below a depth where direct sun-powered (by photosynthesis) biological growth and/or below a depth where waves impose agitation and mixing with biological material in water near surface, and/or where SDI and/or TEP is reduced by at least 50%, 70%, 80% 90%, 95%, 98% or 99% or 99.5% compared to a representative reference at or near surface, in the mixed layer. Preferably, the system of the invention has the seawater inlet located in the thermocline or below.

With the system of the invention, compared with typical systems on land, the pre-treatment facilities on land or topsides upstream the reverse osmosis unit can be reduced, preferably reduced by 20%, 40%, 50%, 70%, 80% or 90% more, in terms of investment, area required, power consumption with or without $CO_2$ emission, and personnel required, estimates indicate. This is due to the combination of much more feasible water quality for reverse osmosis, with much lower SDI and/or TEP, and the effect of subsea water pre-treatment in subsea coarse screen units and/or subsea filtration and/or subsea pre-treatment units.

The pre-treatment unit of the system and seawater inlet of the invention as a minimum comprises a subsea filter or seawater coarse screen unit at the subsea inlet. Coarse screen unit openings are maximum having diameter or side length 100 mm, 75 mm, 50 mm, 25 mm, 10 mm, 5 mm 2 mm or 1 mm or smaller. Preferably, the coarse screen unit is designed to be operative as long as the subsea pump before retrieval or replacement. Preferably, the coarse screen unit comprises sacrificial anodes, and/or an autonomous unit for backflushing, vibrating and/or for cleaning. In some preferable embodiments, the coarse screen unit is replaced by or is complemented by a filter that can be down to mm or micron size with respect to filtration. One preferable embodiment is a mm or micron filter cloth, made from polymer, copper, brass or other feasible material, being arranged to be drawn from one roller to another across the intake opening as the cloth is fouled, preferably driven by an autonomous drive, for example battery driven, or for example a stepper motor powered from the subsea pump power supply. The system and seawater inlet preferably further comprises a subsea seawater pre-treatment unit at least comprising a filtration device, preferably comprising filtration units for filtering down to micron size. The subsea pre-treatment unit or units are preferably further comprising at least one injection arrangement for deoxidizing and/or disinfection and/or anti-coagulant and/or scale inhibitor, wherein each injection arrangement or a combined injection arrangement preferably is coupled to the subsea pump outlet or inlet or further upstream by a venturi dosing valve or at other position allowing sufficient mixing and residence time before reaching any further filtration units and before reaching the RO-unit. Injection units are preferably arranged as a bore in a power and/or control line or umbilical, driven by gravity and/or a topside injection pump.

In some preferable embodiments of the system and seawater inlet of the invention, a subsea seawater pre-treatment unit is arranged upstream to the seawater intake line and/or a further pre-treatment unit is arranged between the seawater intake line and the RO unit, at least comprising a filtration device with filtration units for filtering down to micron size, removing bacteria, preferably further comprising a filtration unit for filtering down to nano-size, also removing viruses. Filtration preferably is at least down to microfiltration, 1 micrometre, whereby the water to be desalinated is free of bacteria, with nanofiltration, also termed ultrafiltration, down to 1 to 20, 50 or 200 nanometre, also free of viruses. Thereby, the concentrate is made feasible for use in aquaculture (fish- and shell farming), fertilizer production, mineral production and/or chemicals production, and the freshwater produced is directly feasible for agriculture, and, after optional further treatment feasible as potable water, and as a source for green hydrogen.

In some embodiments, the pre-treatment unit comprises filtration units replaceable by a service boat. A pre-treatment unit embodiment without integrated pump can be most preferable, since one mechanical coupling may be a sufficient coupling, and if the units are too large and heavy for easy handling by a service boat with crane/winch and boom, several smaller units in parallel, each small and light enough for handling, can be preferable. Easily replaceable filtration units can be preferable when their stable period of operation is shorter than the period for retrieval and maintenance of the subsea pump.

The power supply preferably is from solar power sources and/or wind power sources, wherein the water supply chain can be emission free with respect to $CO_2$ and pollution. However, conventional power sources may be used. This may particularly be the case where the pump or other components of the system are placed on or around an existing platform where the pump and system can utilize power and other existing infrastructure to reduce cost, improve maintenance capabilities and accelerate the commissioning of the system.

The system preferably is further comprising, one or more of, in any combination as required based on raw untreated inlet seawater quality and product requirements, and listed in a typical direction of flow:

a disinfection unit upstream to the subsea pump, a sedimentation unit upstream to the pump, an ultra and/or micro and/or nano filtration unit upstream to the subsea pump, a subsea pump inlet chamber wherein one or more of the units defined above are arranged, a chlorophyll fluorescence device, as a biofouling precursor measurement instrument, an on-site or remotely connected biofouling monitor system to examine membrane condition, for example based on differential pressure and/or flow monitoring, equipment for Dissolved Organic Matter-DOC-samples and measurement at one or more points upstream to the RO membrane micro and/or nano filtration units downstream to the intake line and upstream to the RO unit, a RO unit with a reverse osmosis pump and a PX energy recovery unit operatively arranged.

at least one tank for freshwater, a tank for concentrate, a pipe-in-pipe or parallel pipes, for concentrate (brine) discharge, wherein the seawater intake line includes or has arranged in parallel a concentrate discharge line, at least for a distance interval from the outlet on land or above a surface level, for facilitating pipe-laying and survey, a tank for hypersaline solution (for direct osmosis of RO membranes) arrangements for backflushing and/or cross flushing.

direct osmosis for RO membrane cleaning, and, as necessary or desirable, piping, valves, optional further pumps, optional further units and instrumentation.

Further, the invention provides use of the sea water intake of the invention, for reducing the extent of required pretreatment of seawater or other saline water on land or topsides, and/or overall, in a new or existing system or plant for desalination of saline water by reverse osmosis.

The invention also envisions the use of multiple pumps and equipment to, among other things, allow for redundancies, increased flow, increased filtration, better water quality and performance.

Further, the invention provides use of the concentrate delivered from the concentrate outlet, for aquaculture, fertilizer production, mineral production and/or chemicals production, and/or wherein the freshwater produced is directly feasible for agriculture, and (optionally after further treatment) feasible as potable water, and a source for green hydrogen.

Finally, the invention provides use of a hypersaline solution produced by recirculating concentrate through the RO-unit, for cleaning a reverse osmosis membrane of the RO unit by effecting direct osmosis.

The pumps of the system are preferably as designed and built by the Applicant, but feasible pumps are available also from other commercial suppliers.

The invention also provides use of the concentrate of the system and/or the method of the invention, which concentrate is without particles above 1 micron, 0.5 micron, 0.1 micron or smaller and bacteria and/or viruses, for one or more of, in any combination:

for backflushing and/or cross flushing filters for producing hypersaline fluid for direct osmosis, for cleaning RO membranes for delivery for use in aquafarming, preferably for growing small salmonids to larger salmonids and/or to facilitate the fresh to saltwater shift for the fish, for lower mortality and faster growth, using the concentrate, which is of high purity, for mixing into freshwater gradually, for producing industrial products by evaporation and crystallization

DETAILED DESCRIPTION OF THE INVENTION

Figure 1:
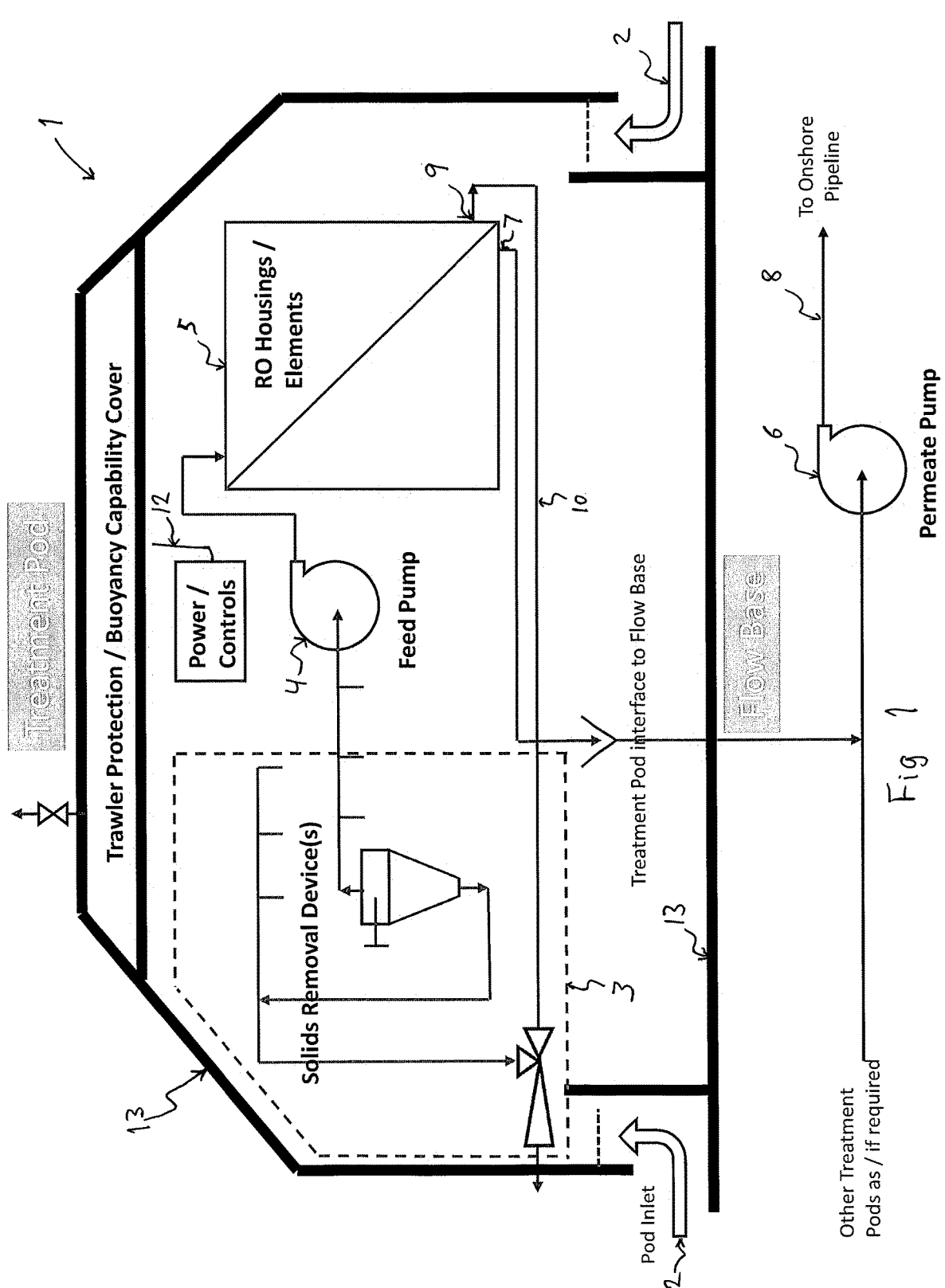
FIG. 1 illustrates an embodiment of the system of the invention.

Reference is made to FIG. 1, illustrating a preferable embodiment of a system 1 of the invention. The system 1 of the invention for producing desalinated water from seawater or other saline or contaminated water comprises, in the direction of flow: a subsea seawater inlet 2; a subsea pretreatment stage 3 at least comprising one or more of a subsea filter and/or a subsea seawater pre-treatment unit and/or a subsea coarse screen unit, and/or a hydrocyclone; a subsea feed pump 4, fluidly coupled to; a subsea RO unit 5; a subsea product pump 6 fluidly coupled to a RO unit product outlet 7; a product line 8 fluidly coupled to the subsea product pump; and a RO unit reject outlet 9, coupled to a reject line 10. The subsea seawater inlet is at a depth 11 (static head) below or within the thermocline layer of the seawater, that is below the epipelagic zone, or as close as feasible if the local depth is insufficient to reach the thermocline layer. The umbilical, or more correctly the power and control line 12 operatively coupled to the subsea pumps or subsea treatment pods for power and control, extending from a location above the seawater surface, consist of one or two lines or cables without any barrier fluid supply line to the pumps. For operating the system of the invention, it is sufficient to connect power and control only, which apparently is a unique feature saving equipment and infrastructure subsea and on shore or topsides, while simplifying installation, retrieval, maintenance and operation.

The illustrated equipment items are arranged in and on a subsea treatment pod 13, and the treatment pod is retrievable in a single operation and is installable or deployable in a single operation. The number of coupling operations can be as low as one or two, one combined for power and control and one additional or combined for connecting to the product pipeline. Such simplicity apparently is unique.

The illustrated system embodiment makes actively use of the benefits of the natural hydrostatic head at depth to achieve the osmotic pressure differential. In this system embodiment, the subsea feed (seawater) pump only needs to provide sufficient flow to ensure cross-flow across the RO membranes but does not need to generate a high differential pressure to overcome the osmotic pressure of seawater. The Product pump, being downstream of the membranes would in this system experience suction pressures lower than the ambient pressure and down toward 1 bar absolute, or lower, however, pump cavitation must be avoided. The Product pump creates sufficient differential pressure to lift the flow to the surface with sufficient residual pressure for the receiving end, which could be a storage tank or further processing facilities. Since the Product pump, being downstream to the RO membrane, now is generating most of the differential pressure, and this pump is only handling a subset, typically around 50%, preferably less of the total feedwater flowrate (feedwater minus the rejected concentrate), for prolonged operation while minimizing requirement for expensive intervention, the system also becomes more energy efficient. As the inherent osmotic pressure of seawater is 25-33 bar (https://www.sciencedirect.com/topics/chemistry/osmotic-pressure), such system embodiments would generally need to be placed at 300 meter water depth or below, such as at or below 330 m, to work at optimal efficiencies. However, the feed pump can be configured to deliver higher differential pressures, as required according to the location depth and the requirement to exceed the osmotic pressure of seawater over freshwater on the R0 membrane. For example, the shallower the water depth, the higher the differential pressure of the feed pump, to ensure sufficient pressure to exceed the osmotic pressure while also avoiding cavitation in the product pump. The system embodiment illustrated in FIG. 1 includes embodiments spanning from full active use of the pressure head, at locations at about 300 or 330 m depth or deeper, to partial active use of the pressure head, at locations from about 300 to about 25 m depth, still with all process equipment of the full embodiment arranged at a subsea location, preferably arranged as a subsea RO plant at the level of the seawater inlet. As the feed pump is barrier-fluid less it is not contaminating the downstream membranes with hydraulic fluid, ensuring longer life for the membranes and better-quality product water.

Figure 2:
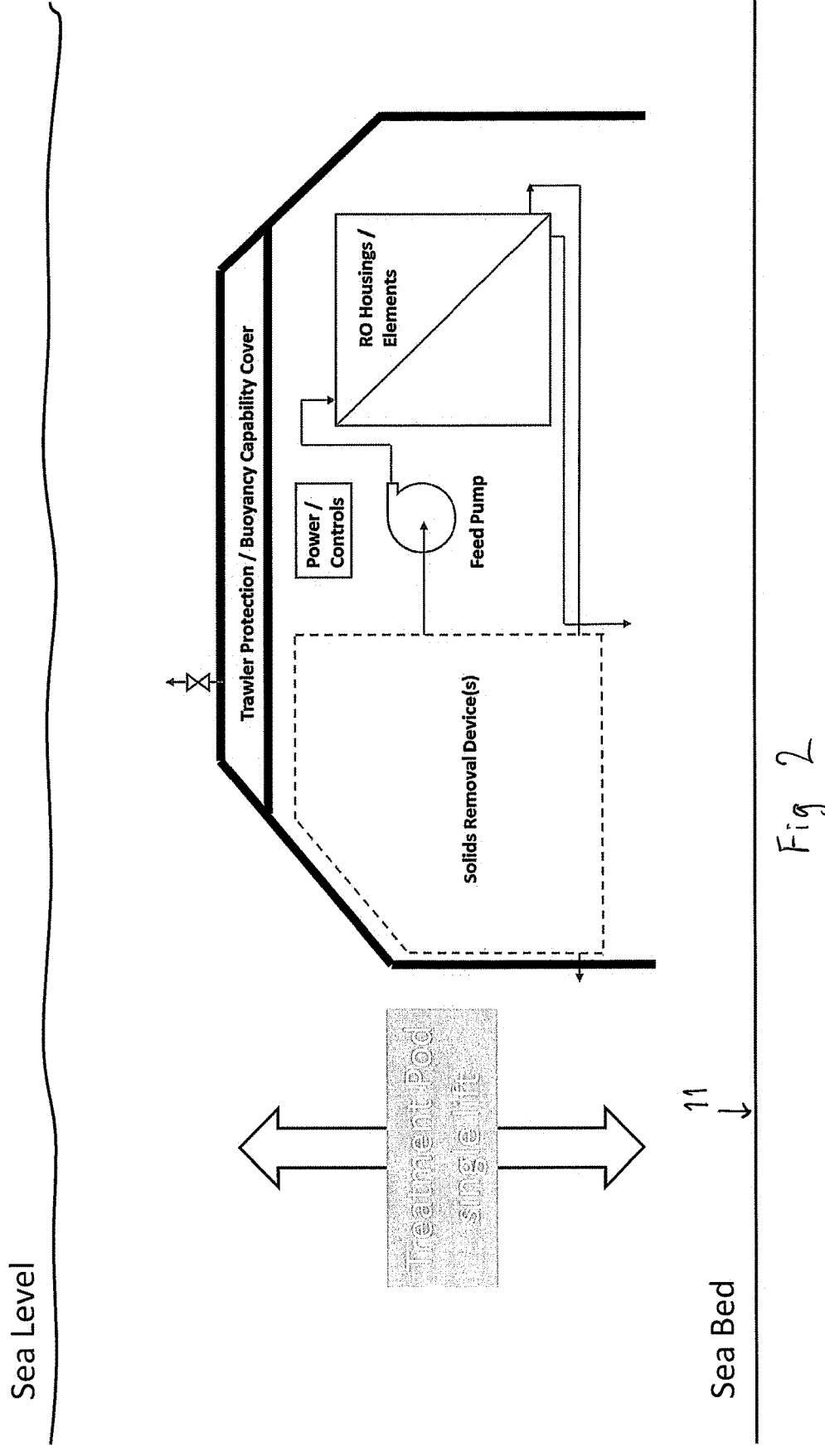
FIG. 2 illustrates how a subsea treatment pod of a system of the invention can be lifted in one operation.

FIG. 2 illustrates how a subsea treatment pod of a system of the invention can be lifted in one operation. More specifically, the subsea treatment pod frame is also a lifting frame, in addition to protecting the structure and equipment items inside from impact through the splash zone during installation and retrieval and functioning as a trawling protection when on the seabed. Coupling operations on the seabed are limited to water out from and for some embodiments also water into the subsea treatment pod, as one or two coupling operations, and power and control, as one or two coupling operations.

The raw seawater inlet can be arranged elsewhere than illustrated, for example further elevated from the seabed, especially with soft, silty seabed conditions.

Figure 3:
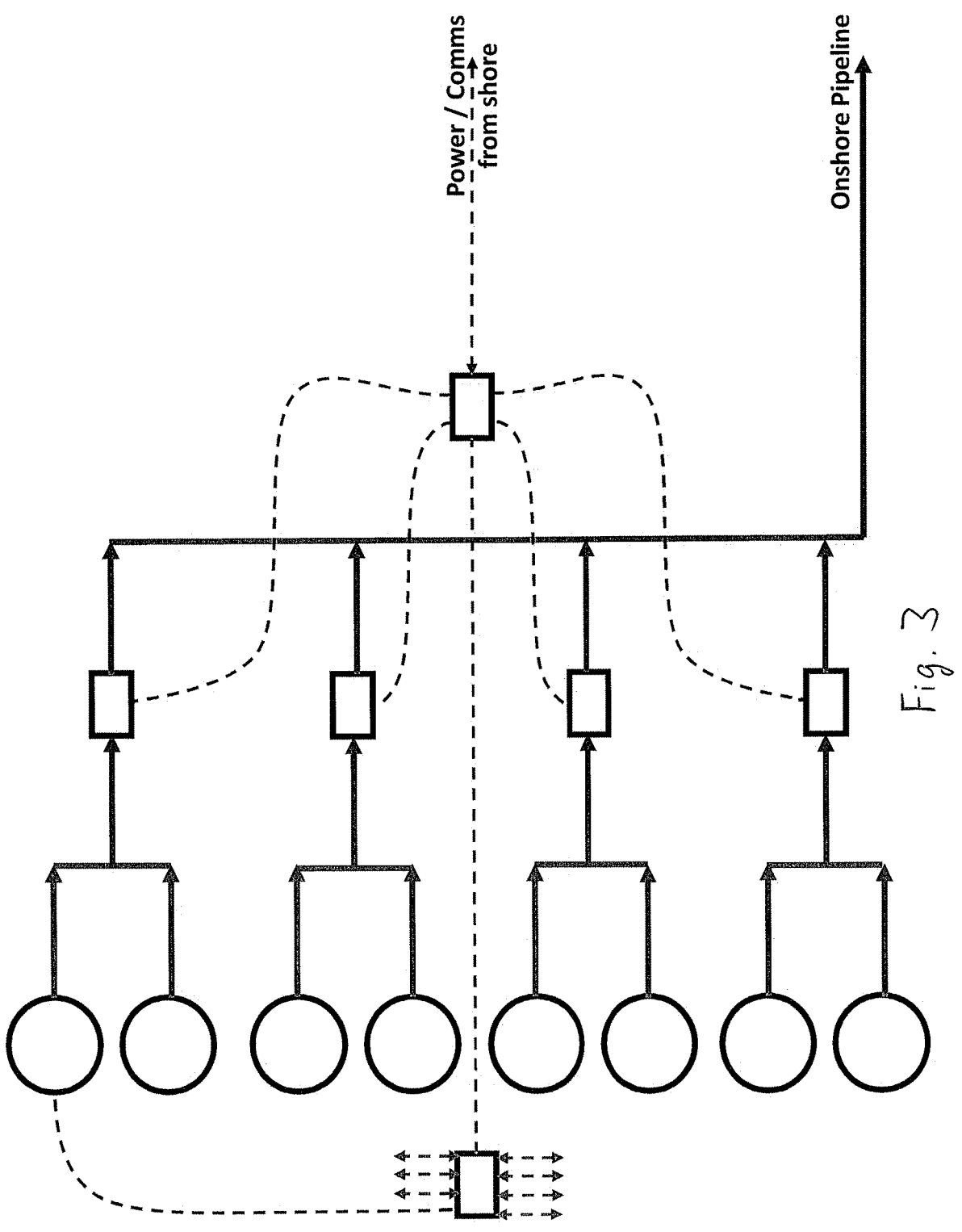
FIG. 3 illustrates a further embodiment of a system of the invention.

FIG. 3 illustrates the principle, where a number of pre-treatment—RO treatment pods are coupled to a smaller number of product pumps, arranged on separate or combined treatment pods on more permanent structure on the seabed, termed flow base. A common product flowline directs the product freshwater to a location above seawater surface.

Figure 4:
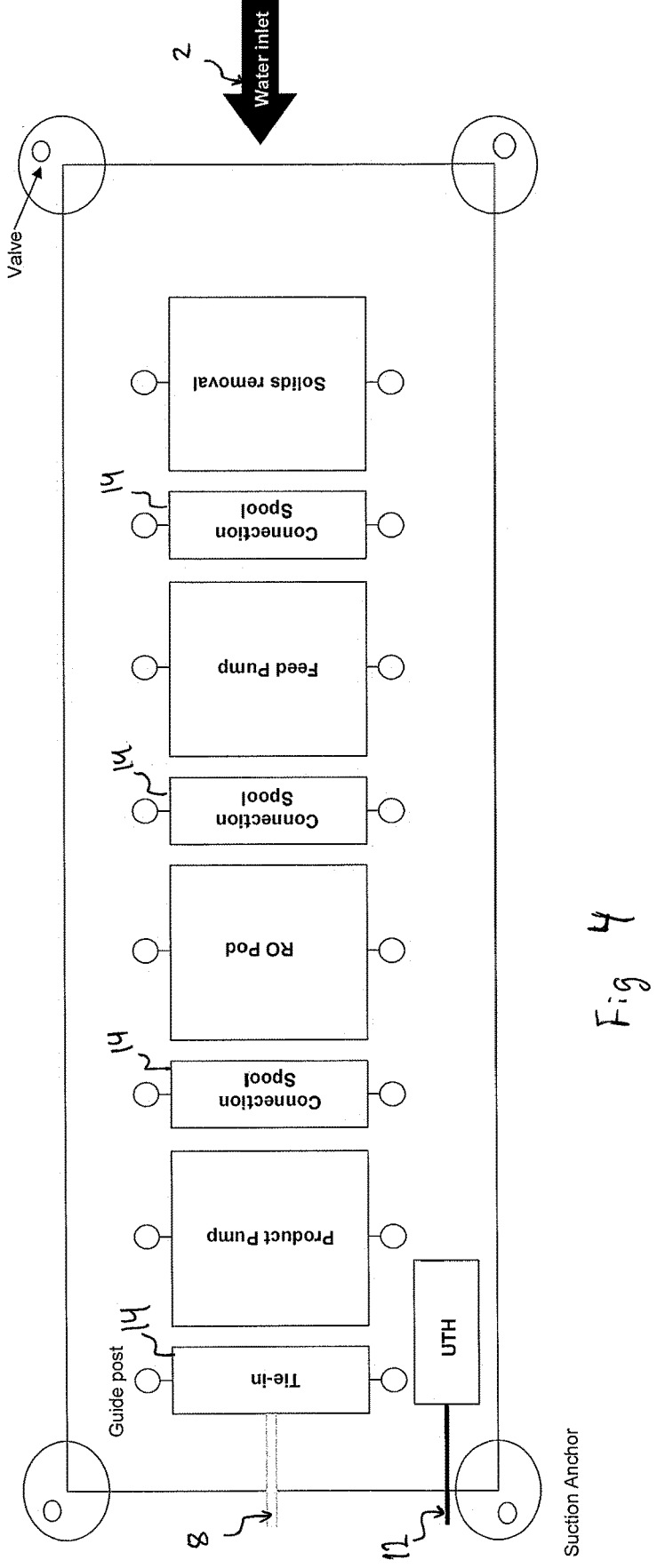
FIG. 4 illustrates a further embodiment of a system of the invention.

FIG. 4 illustrates a further embodiment of a system of the invention, arrange as a "train" of equipment items on a treatment pod, with horizontally oriented flowline couplings 14 for subsea connection-disconnection of the equipment items together.

Figure 5:
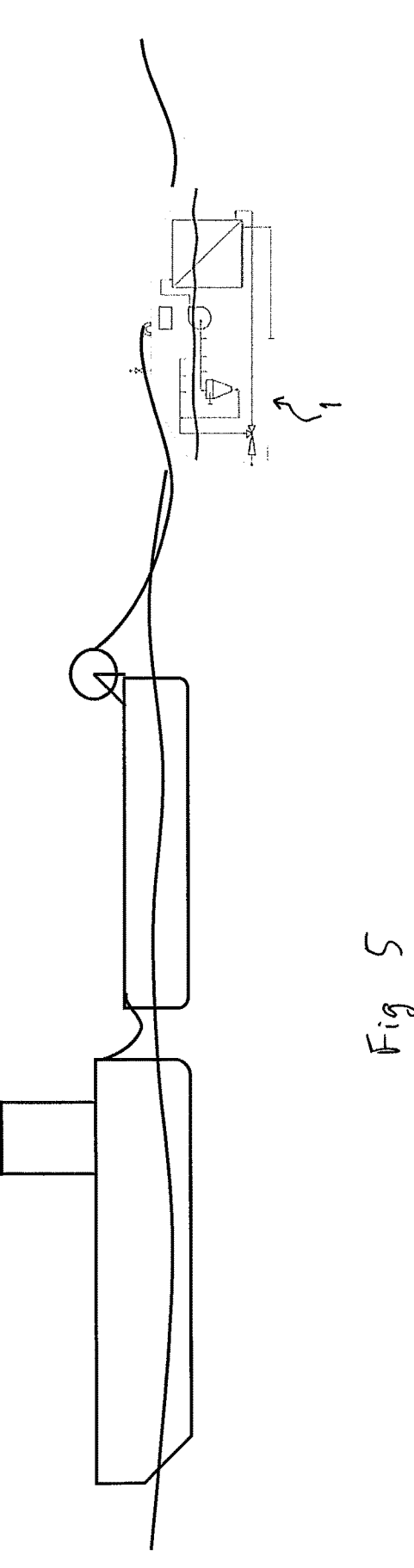
FIGS. 5 and 6 illustrate preferable features of many embodiments of the system and the method of the invention.
Figure 6:
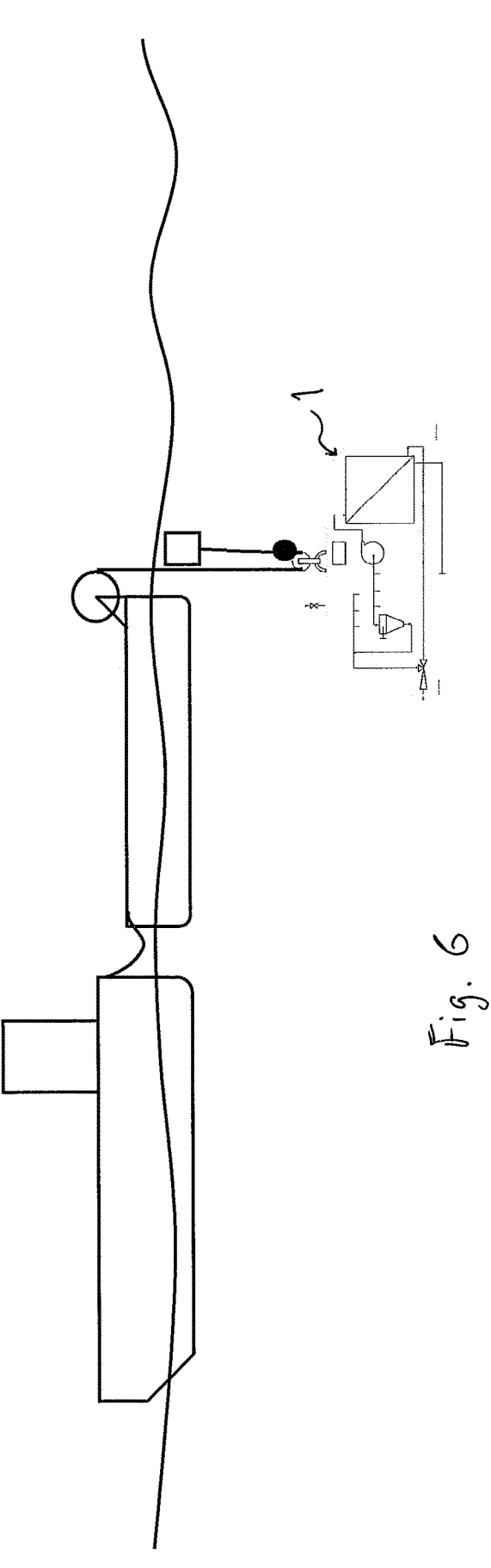

FIGS. 5 and 6 illustrate preferable features of many embodiment of the system of the invention, wherein deballasting-ballasting allows simpler and less expensive installation and operation than typical for operations subsea. Evacuating air from integrated tanks provides negative buoyancy, at a level feasible for installation. These features allow a low overall cost of installation and retrieval since this can be 20-40% of CapEx in a subsea project. This includes, but is not limited to avoiding expensive Heave-compensated crane-vessels. Rather use methods that can be achieved with available workboats that are common in the Middle-Eastern and Mediterranean region. Installation should ideally be based on wet-tow from shore and ballast/de-ballasting operations using compressed air, as illustrated or vacuum and/or buoyancy elements. If needed, a larger vessel may be used for CapEx (installation) but is preferably avoided for OpEx (maintenance). The seabed structure will differ depending on local soil conditions and other factors, so requirement or not for mudmats, slabs, skirts, suction anchors, grouting or similar must be clarified in either case.

Also, the pretreatment requirement vary and must be decided for each case, depending on water quality, life-time expectations etc.

The invention claimed is:

1. A system for producing desalinated water from seawater or other saline water, the system comprising, in a direction of flow:
   a subsea seawater inlet;
   a subsea pretreatment stage, at least comprising one or more of a subsea filter, a subsea seawater pre-treatment unit, a subsea coarse screen unit, and a hydrocyclone;
   a subsea feed pump coupled to a subsea RO unit;
   a subsea product pump coupled to a RO unit product outlet;
   a product pipeline coupled to the subsea product pump; and
   a RO unit reject outlet;
   wherein the subsea seawater inlet is at a depth below or within a thermocline layer of the seawater, below an epipelagic zone, or as close as feasible if a local depth is insufficient to reach the thermocline layer;
   one or more subsea treatment pods, retrievable from and installable on a seabed in one operation; and
   wherein the one or more subsea treatment pods comprise a frame structure for retrieval and installation, the frame structure protecting an equipment through splash zone during deployment and retrieval.

2. The system according to claim 1, comprising a single subsea treatment pod, retrievable and installable in one operation, including all the specified equipment up to and including the subsea product pump and the RO unit product outlet, wherein couplings to the single subsea treatment pod consists essentially of power and control in addition to desalinated water out.

3. The system according to claim 1, comprising a plurality of subsea treatment pods, comprising at least one of:
   at least one subsea treatment pod with a subsea product pump;
   at least one subsea treatment pod with seawater inlet and pre-treatment stage;
   at least one subsea treatment pod with seawater inlet, pre-treatment stage, and feed pump;
   at least one subsea treatment pod with seawater inlet, pre-treatment stage, feed pump and subsea RO unit; and
   at least one subsea treatment pod with feed pump and subsea RO unit, and at least one subsea pretreatment-RO pod combined with a smaller number of product pumps arranged on separate or combined subsea treatment pods.

4. The system according to claim 1, wherein at least one of the one or more subsea treatment pods comprises tanks for ballasting and de-ballasting, for enabling transport, installation and retrieval using a smaller vessel and lifting equipment than without the tanks.

5. The system according to claim 1, wherein the couplings to the system, as located on the seabed to shore or surface, consists essentially of power and control in addition to desalinated water out.

6. The system according to claim 1, wherein the one or more subsea treatment pods comprise individually retrievable equipment items operatively arranged.

7. The system according to claim 1, comprising subsea mateable fluid connections, comprising subsea mateable flowline couplings, with or without clamps, consists essentially of one or two flowline coupling parts and one coupling part for power or combined power and control, for each subsea treatment pod of the one or more subsea treatment pods.

8. The system according to claim 7, comprising ROV operable subsea clamp connectors for mating and un-mating flowline couplings.

9. The system according to claim 1, comprising balanced stab in couplings without reaction forces between a subsea prefiltration unit equipment features and the one or more subsea treatment pods.

10. The system according to claim 1, comprising transponders for positioning, arranged on at least one of guideposts, coupling parts, and equipment features.

11. The system according to claim 1, comprising cameras on at least one of equipment items and the one or more subsea treatment pods, coupled to a control system, monitorable from at least one of an installation vessel and a maintenance vessel.

12. A method employing the system of claim 1, the method comprising the following steps, in any combination:

wet-towing the one or more subsea treatment pods to location or transport otherwise, installing the one or more subsea treatment pods with tanks for ballasting filled with air, whereby ballast tanks are emptied successively until negative buoyancy reach a feasible level, after which the subsea treatment pod is deployed to location, using at least one of transponders and cameras for position control, using the ROV free coupling or couplings mateable by a light work class ROV when connecting the subsea treatment pod to more permanent structure on the seabed, and using the ROV free coupling or couplings mateable by the light work class ROV when disconnecting the subsea treatment pod from more permanent structure on the seabed.

13. A method of operating the system of claim 1, comprising using a feed pump differential pressure lower than normal practice when operation for reverse osmosis, while the feed pump differential pressure is increased periodically, and the reject thereby having significant pressure is directed for backflushing of filters and hydrocyclones of the subsea seawater pre-treatment unit.

14. A method of operating the system of claim 1, comprising operating the system at a low recovery rate of 15-70% of maximum recommended recovery rate on land of the RO units for prolonged uptime.

15. The system according to claim 1, wherein system components up to and including the RO unit and outlets therefrom are at a depth below or within the thermocline layer of the seawater, below the epipelagic zone, or as close as feasible if the local depth is insufficient to reach the thermocline layer.

16. The system according to claim 1, wherein the system is located on the seabed at about 200 m below the surface or deeper.

17. The system according to claim 1, wherein at least one of the one or more subsea treatment pods comprises structure for trawler protection when on the seabed.

18. The system according to claim 8, wherein ROV operable subsea clamp connectors are by a light work-class ROV.

19. The method according to claim 12, comprising using ROV free coupling and disconnecting when installing or retrieving pre-treatment unit equipment items.

20. The system of claim 1, wherein the frame structure is an open frame structure.

21. The system of claim 1, wherein the product pipeline is an onshore pipeline for transporting freshwater onshore to a receiving facility.

22. The system of claim 1, wherein the RO unit product outlet is coupled to the product pipeline via an intermediate pipe section for facilitating installation and maintenance.

23. The system of claim 1, wherein equipment items are coupled directly to or integrated with another equipment item in the direction of flow.

24. The system of claim 1, wherein the RO unit reject outlet is coupled to a reject line.

\* \* \* \* \*